Nov. 7, 1967 K. G. HARPLE ET AL 3,351,911

INTERFACING SYSTEM

Filed Aug. 18, 1964 3 Sheets-Sheet 1

INVENTORS.
KENNETH G. HARPLE
WALLACE B. JAKACKI
BY Arthur H. Swanson
ATTORNEY.

INTERFACING SYSTEM

Filed Aug. 18, 1964 3 Sheets-Sheet 2

INVENTORS.
KENNETH G. HARPLE
WALLACE B. JAKACKI
BY Arthur H. Swanson
ATTORNEY.

INVENTORS.
KENNETH G. HARPLE
WALLACE B. JAKACKI
BY
Arthur H. Swanson
ATTORNEY.

United States Patent Office 3,351,911

Patented Nov. 7, 1967

3,351,911

INTERFACING SYSTEM

Kenneth G. Harple, North Wales, and Wallace B. Jakacki, Chalfont, Pa., assignors to Honeywell Inc., Minneapolis, Minn., a corporation of Delaware Filed Aug. 18, 1964, Ser. No. 390,428
1 Claim. (Cl. 340—172.5)

ABSTRACT OF THE DISCLOSURE

An interfacing system is provided wherein magnetic cores couple the input or output terminals of respective electronic devices to a control means. The control means includes a plurality of windings which are selectively and uniquely connected to the cores. Signal supplying devices are connected to the windings. Through the combination of windings and signal supplying means, one and only one core is activated whereby the associated electronic device is operational.

This invention relates to digital computers. More specifically, the present invention relates to signal buffers for digital computers.

An object of the present invention is to provide a signal buffer for a digital computer.

Another object of the present invention is to provide a signal buffer for input and output digital signals for a digital computer.

Still another objects of the present invention is to provide a signal buffer for transferring digital signals between a digital computer and associated input and output devices while preventing unwanted transient signals from affecting the transferred signals.

A further object of the present invention is to provide a digital signal buffer for decoding input and output signals communicated between a digital computer and associated devices.

A still further object of the present invention is to provide a digital signal buffer for simultaneously handling input and output signals between a digital computer and associated digitally responsive devices.

Still another further object of the present invention is to provide an integrated digital signal buffer for handling computer input and output signals and having a simple operation and construction.

In accomplishing these and other objects, there has been provided, in accordance with the present invention a buffer apparatus for digital computer input and output signals comprising a magnetic core array wired on a common bus with first current-carrying conductors for driving the cores to change their stable magnetic states and second conductors for selectively providing inhibit currents to prevent a change of magnetic state in undesired cores. The first and second wires are arranged to select ones of groups of cores being used to perform different functions in an overall digital signal buffer system including decoding digital signals to select individual ones of a plurality of input and output devices arranged in a matrix. Sense windings are used on each core to detect a change of magnetic state while preventing stray signals from providing an effective buffer output signal.

A better understanding of the present invention may be had when the following detailed description is read in connection with the accompanying drawings, in which.

Figure 1:
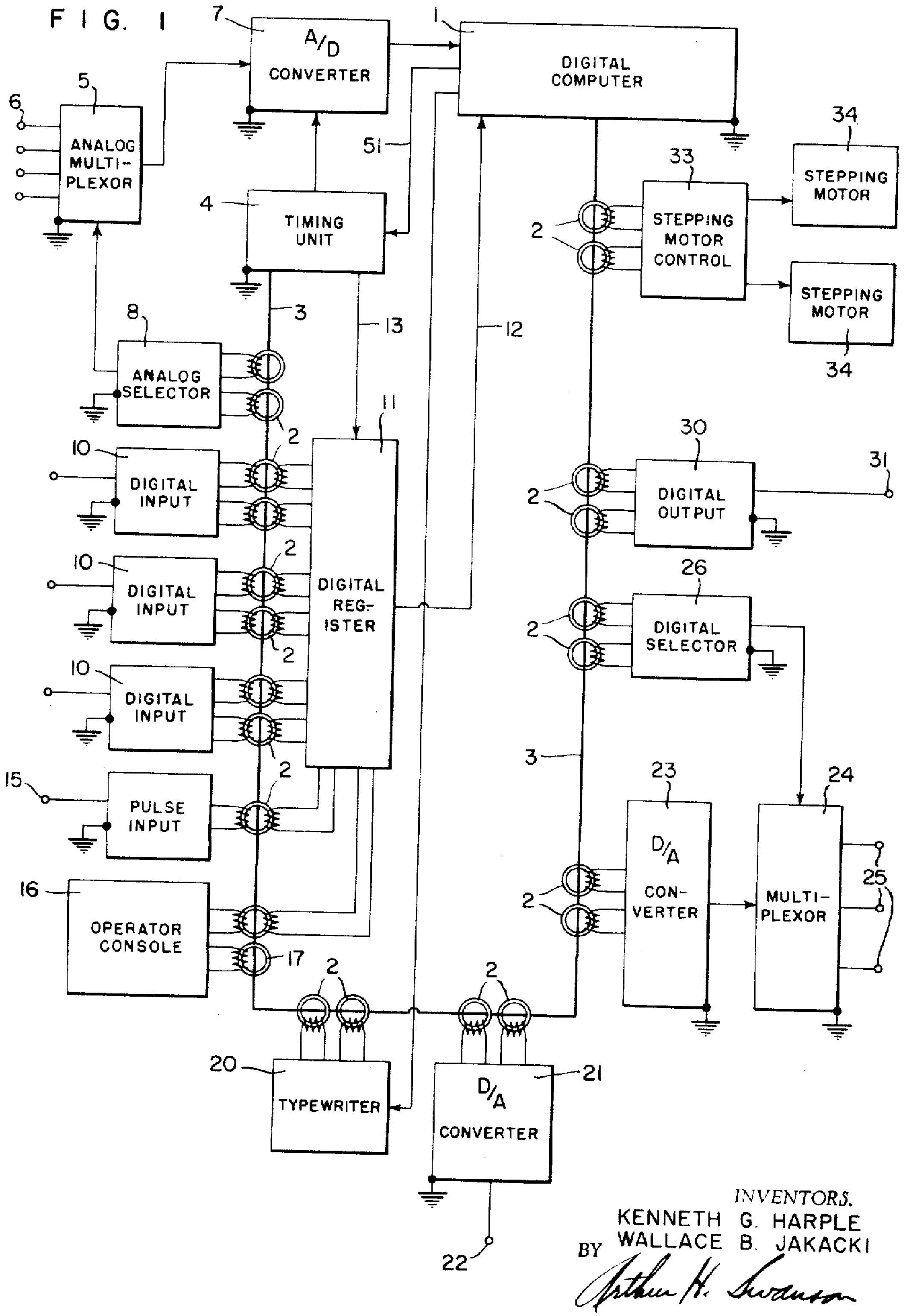
FIG. 1 is a block diagram of a digital computer system using the input-output buffer of the present invention.
Figure 2:
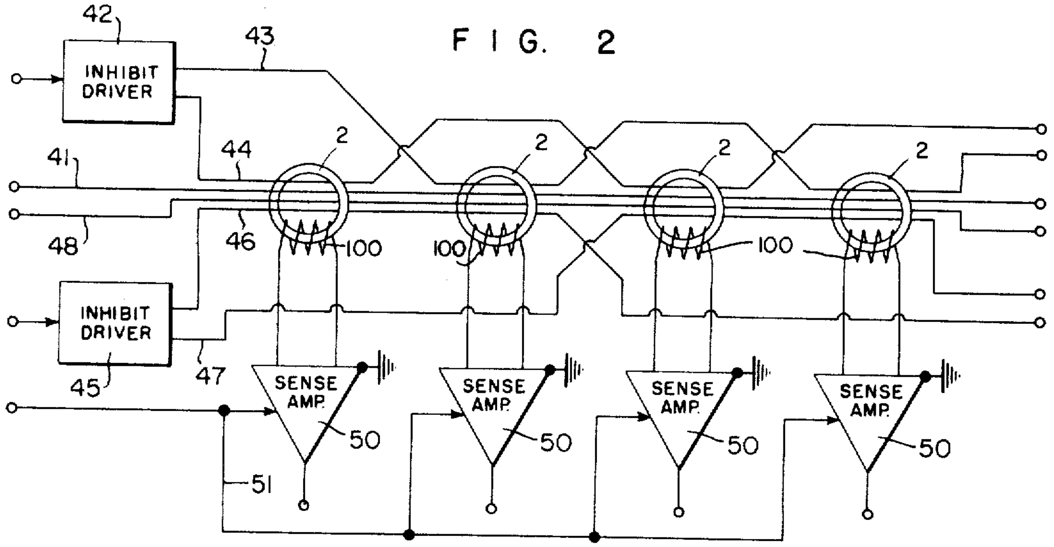
FIG. 2 is a schematic illustration of a typical buffer stage used in the computer system shown in FIG. 1.

Referring to FIG. 1 in more detail, there is shown a digital computer 1 having an input and output signal buffer embodying the present invention. The input and output buffer comprises a plurality of signal transmitting magnetic cores 2 arranged on a prewired electrical conductor selection bus 3. The bus 3 is selectively operated by the computer 1 and a timing unit 4 to produce output signals on selected ones of the cores 2 representative of applied core input signals. The specific arrangement of the cores 2 and the selection bus 3 is shown in FIG. 2 and described hereinafter. The output signals from the cores 2 are digital signals which may be utilized to effect communication between the digital computer 1 and the associated equipment. As illustrated in FIG. 1, an analog multiplexor 5 is arranged to sequentially select individual ones of a plurality of analog input terminals 6. The analog signals appearing on input terminals 6 are sequentially connected to an A/D converter 7 for conversion to digital signals suitable for the digital computer 1. The multiplexor 5 is sequentially operated by an analog selector circuit 8 driven from the cores 2 while the A/D converter 7 is triggered into operation by the timing circuit 4 after the analog input has been selected.

Digital signal inputs may be transferred into the computer 1 by an arrangement as shown generally in FIG. 1. Thus, digital input terminals 10 are connected to supply input signals to respective cores 2 on the selection bus 3. The output signals from the cores 2 are applied to a digital register 11 for subsequent transfer on line 12 to the computer 1. This transfer is under control of a timing signal supplied from the timing unit 4 along line 13. A circuit suitable for such a digital input arrangement is shown in detail in FIG. 3. Similarly, pulse input signals from a pulse input terminal 15 and an operator's manually operated console 16 may be transferred to the computer 1. A core 17 may be also used to transfer digital signals from the computer 1 to visual or audible read-out devices on the console 16 to provide computer output representations for the operator.

The digital output signals from the computer may be transferred to a read-out device such as a typewriter 20 having means for electro-magnetic actuation of the typing elements. Additionally, the digital output signals may be transferred to a D/A converter 21 to be applied to an analog output terminal 22. Another D/A converter 23 may be used to convert the digital signals for subsequent sequential multiplexing by a multiplexor 24 to a plurality of output terminals 25. The multiplexor 24 is controlled by a digital selector circuit 26 operated from digital signals transferred from the cores 2. The digital signals from the bus 3 and cores 2 may be used directly either by applying them to a digital output circuit 30 having an output terminal 31, or by applying to a digitally responsive controller, such as a stepping motor control 33 to control stepping motors 34 for direct process control by the computer 1. In these arrangements of the input and ouptut devices associated with the computer 1, it may be seen that the cores 2 and bus 3 form a signal buffer to isolate the computer 1 from undesired signals while allowing an unimpeded flow of information signals to and from the computer 1. Thus, the computer 1 is effective to function in the presence of otherwise damaging or disruptive transients without affecting its internal operation and immediate contact with associated external devices.

In FIG. 2, there is shown a schematic illustration of a typical signal buffer circuit suitable for use in the applications described above with respect to the computer system shown in FIG. 1. The buffer circuit comprises a plurality of cores 2 which are each driven, or switched, in a conventional manner between stable states at opposite ends of the hysteresis loop. This switching action is effective to provide an output signal on a "sense" winding wound on each core. The switching of the cores is effected by a pulse of current sent along a "drive" wire 41 threading all the cores. This current will switch all the cores which are not in the end state to which the drive current will drive the core. However, the cores 40 are arranged on a prewired assembly of current-carrying wires in a core selecting array. This core selection is effected by selectively energizing combinations of the selecting wires threading the cores 2. Four selecting wires are provided in a coded array to supply "inhibit" currents; i.e., currents that prevent the cores from switching. Thus, a first inhibit driver 42 may provide an inhibit current pulse to oppose the drive current on either of two inhibit wires 43 and 44. Similarly, a second inhibit driver 45 may provide a current pulse on either of two wires 46 and 47. By preselecting one of each pair of inhibit wires, the drive current is prevented from switching all but one core in the core array. This unique defining of a core to be switched is achieved by the wiring of the inhibit wires 43, 44, 46 and 47 in which each core has a unique combination of inhibit wires threading it. The switched core is, subsequently, returned to its prior state in preparation for further switching by a "redrive" current pulse supplied along a redrive wire 48 threading all the cores 2. The redrive current is of an opposite polarity to that of the "drive" current in order to return a switched core to its prior state.

An output signal from the sense windings 100 on each of the core 2 is applied to the input circuits of respective "sense" amplifiers 50. Since the drive and redrive pulses are effective to produce output signals from the sense windings, the sense amplifiers 50 are selectively energized into a signal conducting state by a "strobe" pulse applied along line 51. Thus, only the output signal derived from the effect of the drive pulse is allowed to appear on the output terminal of the corresponding sense amplifier. The drive, redrive and strobe pulses are obtained from the timing unit 4 by means of conventional timing circuits which are effective to produce a train of delayed signals. The timing unit 4 also includes the inhibit drivers 42 and 45 which are selectively triggered by digital signals from the computer 1 along line 51, shown in FIG. 1, to effect a core selection. Thus, the digital signals from the computer are transferred to the output circuits of the amplifiers 50 as representative digital signals with the cores 40 providing a signal buffer. The circuit, shown in FIG. 2, is, of course, only a portion of the entire core matrix necessary to transmit a long, i.e., twelve bit, digital word from the computer 1. The further extension of this one-bit circuit to accommodate long digital words is simply a matter of adding cores and continuing the coded arrangement of the inhibit wires for each bit. The circuit shown in FIG. 2 may be used directly as a buffer for the digital output 30, the D/A converter 21, and the digital input 17 to the operator's console 16.

Figure 3:
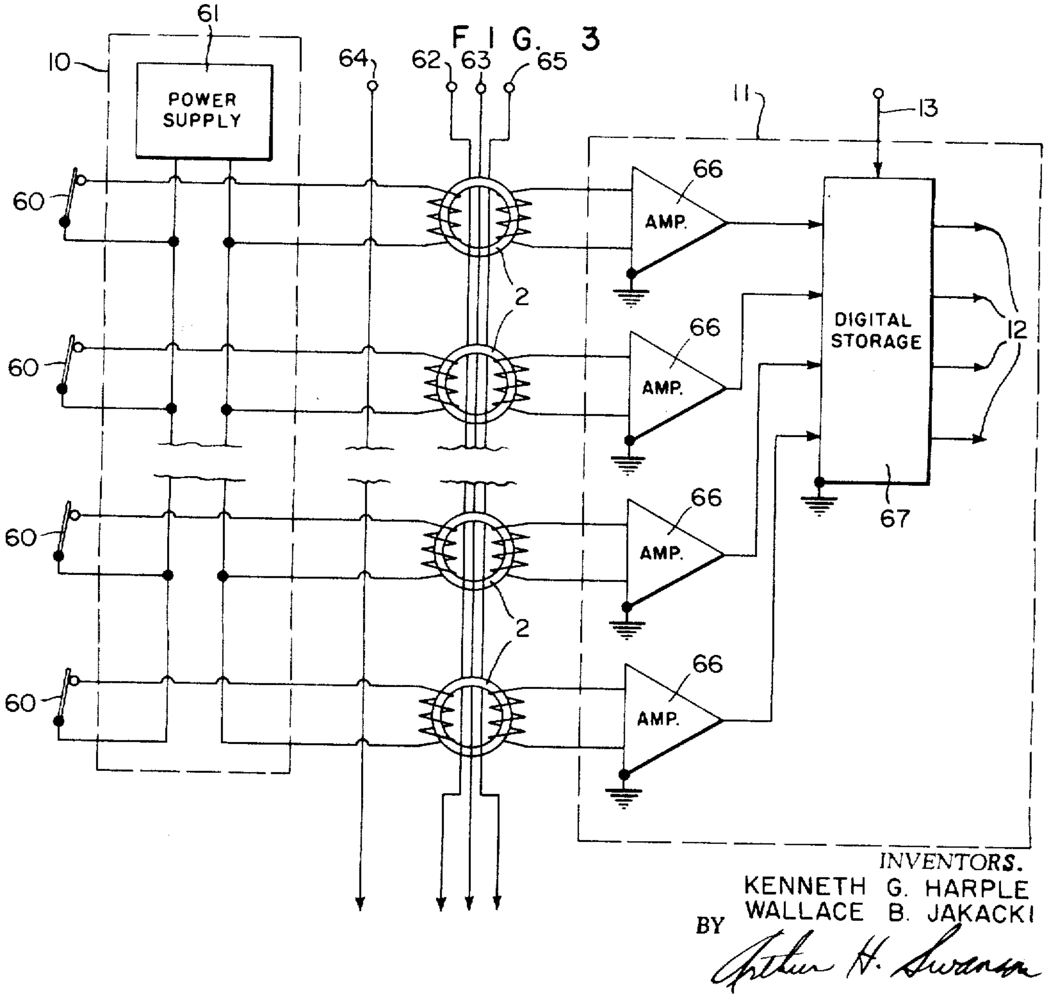
FIG. 3 shows a schematic illustration of the digital buffer input section of the computer system shown in FIG. 1 using the present invention.

In FIG. 3, there is shown a modification of the buffer shown in FIG. 2 which is suitable for use as the digital input 10, the pulse input 15 and the operator's console 16 input to the computer. In this modification, a plurality of contacts 60 are used to define a digital word to selectively place a selecting current into the cores 2 from a power supply 61. The drive and redrive wires 62 and 63 are used as described with respect to FIG. 2. Similarly, inhibit wires 64 and 65 are arranged to select cores but not individual cores as shown in FIG. 2. The circuit shown in FIG. 3 uses the contacts 60 to select individual cores so the inhibit wires 64 and 65 are arranged to select digital words. In other words, one inhibit wire may be energized to inhibit a whole digital word corresponding to the group of cores it is threaded through. Thus, one digital word is transferred at a time through the associated cores 2 and, sense amplifiers 66 into a digital storage 67; e.g., flip-flops, for subsequent application to the computer 1 along lines 12. The digital storage 67 may include gating circuits controlled by a timing signal applied along line 13 from the timing unit 4 to effect an ordered transfer of the digital signals to the computer 1.

Figure 4:
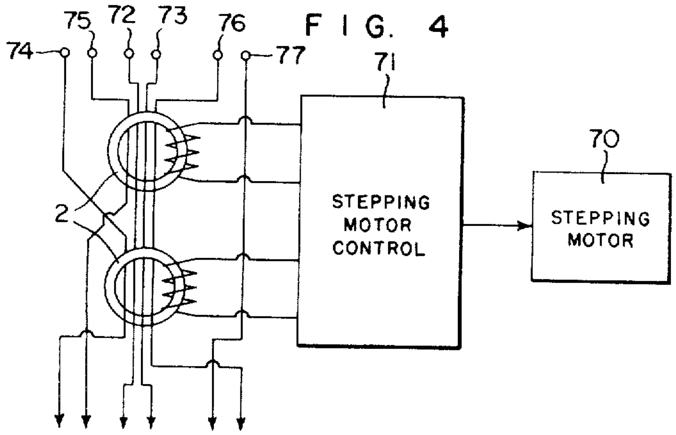
FIG. 4 shows a schematic illustration of the stepping motor control section of the computer system shown in FIG. 1.

The circuit shown in FIG. 4 is an adaptation of the buffer circuit to a means for driving a digitally responsive device such as a stepping motor 70. The stepping motor control 71 may be any suitable device which is arranged to respond to signals of one type, for example polarity, to drive the stepping motor 70 in one direction while signals of another type produce a motor actuation in another direction. Accordingly, for each motor only two cores are necessary to select an "up-down" operation of the motor 70. Thus, cores 2 are arranged in pairs for each motor control 71 with the effect of the sense windings reversed in order to change the polarity of the output signal thereby to change the control exercised by the motor control 71. The drive and redrive wires 72 and 73 are threaded through both cores while the inhibit wires 74, 75, 76 and 77 are used to select the motor to be operated and the direction of rotation. Specifically, the drive and redrive pulses are used to step the motor 70 while inhibit wires 74 and 75 select the direction of rotation. The inhibit wires 76 and 77 are then used to determine the selection of the motor 70 when a plurality of stepping motors are available. Thus, the stepping motor 70 may be selected by the computer 1 and stepped a desired number of steps in response to the digital signals from the computer 1.

Figure 5:
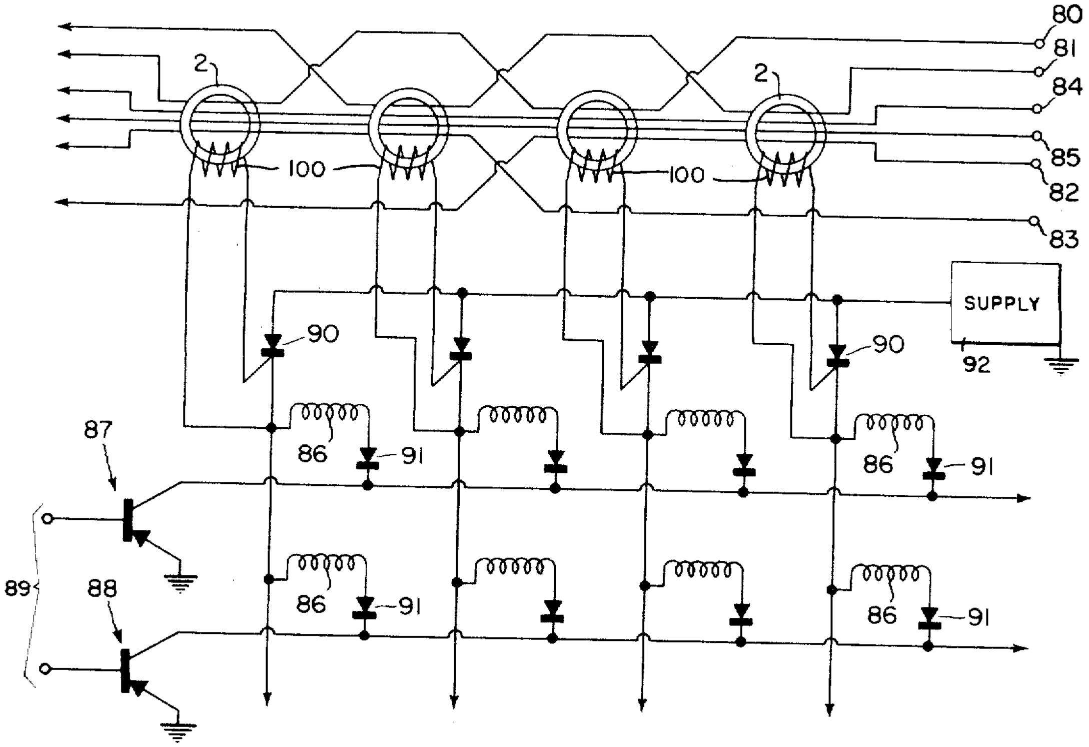
FIG. 5 shows a selection matrix arrangement suitable for use with the signal buffer apparatus shown in FIG. 1.

In FIG. 5, there is shown a circuit suitable for use as the typewriter control 20, the analog multiplexor 5 and analog selector 8, and the digital multiplexor 24 and digital selector 26 as shown in FIGURE 1. The digital signals from the computer 1 (see FIGURE 1) are used to select ones of the cores 2 by inhibit wires 80, 81, 82, and 83 while the drive and redrive wires 84 and 85 provide the pulse output signals on the core sense windings 100. These sense windings are connected to a matrix for effecting a selection of individual operating elements 86. For example, the circuit shown in FIG. 5 may be used as the analog multiplexor 5 and analog selector 8 in which case the elements 86 would be switch operators to step the multiplexor 5 through the analog-inputs 6. The horizontal matrix inputs are shown coming from a pair of transistors 87 and 88. These would be suitable for a typewriter control 20 in which case the computer 1 would supply timing signals to the horizontal lines along a line 89. In the aforesaid use for the analog selector 8 and multiplexor 5, the horizontal lines could be selected by another core buffer array similar to that shown for selecting the vertical lines. In either case, the vertical selection of a matrix line is effective to turn on a vertical SCR, such as SCR 90, which then allows a current to flow through the matrix element 86 to a connecting diode 91. The horizontal line having been previously selected, the appropriate diode 91 is biased into a conducting state to form a current path through the transistor 87, the diode 91, the element 86, the SCR 90 to a power supply 92. The current is effective to energize the element 86; e.g., operate a typewriter key.

The circuits shown in FIGS. 2 to 5 are combined, as discussed above, into an overall signal buffer device for the computer 1 with the bus 3 for the buffer comprising the drive, redrive and four inhibit wires selectively threaded through the cores 2 as shown in FIGURE 1. This buffer structure enables the computer 1 to receive selected analog and digital input signals while output signals are transferred to various output apparatus such as a typewriter, A/D converter and direct digital control means, such as stepping motors. The buffer, also, provides the inherent characteristic of decoding the digital signals from the computer 1 while excluding unwanted transient signals from the channels of computer communication.

Accordingly, it may be seen that there has been provided, in accordance with the present invention, a signal buffer for providing a digital signal communication link between a digital computer and associated input and output devices while preventing unwanted signals from affecting the communicated digital information.

What is claimed is:

An interfacing system comprising, input means, output means, each of said input means and said output means having terminal means, a plurality of magnetic elements, each of said magnetic elements exhibiting a hysteresis characteristic having a plurality of regions of substantial saturation, each of said magnetic elements individually connected to a separate one of said terminal means, pulse supplying means coupled to each of said magnetic elements for supplying thereto signals having two different levels, each of said different levels of signals operative to drive said magnetic elements to opposite magnetic conditions, inhibit means for selectively supplying signals to said magnetic elements in accordance with preselected and unique coupling arrangements at each of said magnetic elements, said signals supplied by said inhibit means having a magnitude and sense to drive said selected magnetic elements to saturation in one magnetic condition whereby said signals supplied by said pulse supplying means effect no change in the magnetic elements which receive signals from said inhibit means, said magnetic elements which exhibit a change in the magnetic condition thereof as a result of a drive signal from said pulse supplying means and the concurrent absence of a signal from said inhibit means produce a signal at said terminal means of the associated input and output means, and digital computer means selectively transferring signals relative to said input means and said output means in accordance with the production of a signal at one of said terminal means.

References Cited

UNITED STATES PATENTS

| | | | |
|---|---|---|---|
| 2,734,182 | 2/1956 | Rajchman | 340—174 |
| 2,782,399 | 2/1957 | Rajchman | 340—174 |
| 2,933,618 | 4/1960 | Buck | 307—88 |
| 3,034,101 | 5/1962 | Lowe | 340—172.5 |
| 3,061,192 | 10/1962 | Terzian | 340—172.5 |
| 3,094,610 | 6/1963 | Humphrey et al. | 235—157 |
| 3,157,862 | 11/1964 | Eachus | 340—174 |
| 3,164,824 | 1/1965 | Fredericks | 340—172.5 |
| 3,200,380 | 8/1965 | MacDonald et al. | 340—172.5 |
| 3,201,759 | 8/1965 | Kelly | 340—172.5 |
| 3,238,505 | 3/1966 | Shapiro | 340—172.5 |
| 3,248,701 | 4/1966 | Eisenstein et al. | 340—172.5 |
| 3,293,612 | 12/1966 | Ling | 340—172.5 |

OTHER REFERENCES

Steckenrider, R. N.: Magnetic Core Translator, in IBM Tech. Discl. Bulletin, 2(2), pp. 13–14, August 1959.

ROBERT C. BAILEY, *Primary Examiner.*

PAUL J. HENON, *Examiner.*

J. P. VANDENBURG, *Assistant Examiner.*